United States Patent
Wato et al.

(10) Patent No.: US 7,354,093 B2
(45) Date of Patent: Apr. 8, 2008

(54) WINDOW EDGE MOLDING FOR MOTOR VEHICLE

(75) Inventors: Yasuhiro Wato, Aichi (JP); Hirofumi Yamane, Saitama (JP); Koichi Sakamoto, Saitama (JP)

(73) Assignees: Tokai Kogyo Co., Ltd., Aichi (JP); Honda Motor Co., Ltd., Tokyo (JP)

( * ) Notice: Subject to any disclaimer, the term of this patent is extended or adjusted under 35 U.S.C. 154(b) by 183 days.

(21) Appl. No.: 10/522,384

(22) PCT Filed: Jul. 25, 2003

(86) PCT No.: PCT/JP03/09482

§ 371 (c)(1),
(2), (4) Date: Nov. 4, 2005

(87) PCT Pub. No.: WO2004/011290

PCT Pub. Date: Feb. 5, 2004

(65) Prior Publication Data

US 2006/0125275 A1 Jun. 15, 2006

(30) Foreign Application Priority Data

Jul. 31, 2002 (JP) ............................. 2002-222734

(51) Int. Cl.
*B60J 10/02* (2006.01)
(52) U.S. Cl. ...................................................... 296/93
(58) Field of Classification Search ............... 296/84.1, 296/93; 52/717.03, 717.05
See application file for complete search history.

(56) References Cited

U.S. PATENT DOCUMENTS 3,672,109 A 6/1972 Erck (Continued)

FOREIGN PATENT DOCUMENTS

EP 0 819 560 A1 1/1998

(Continued)

OTHER PUBLICATIONS

Office Action dated Dec. 29, 2006 issued in corresponding Chinese Application No. 03817987.3.

*Primary Examiner*—Lori L. Lyjak
(74) *Attorney, Agent, or Firm*—Westerman, Hattori, Daniels & Adrian, LLP.

(57) ABSTRACT

A vehicular window molding attached along a gap between a window opening edge of a vehicle body panel and an outer peripheral edge portion of a window pane arranged at the window opening. The vehicular window molding includes a molding main body portion attached to the outer peripheral edge portion of the window pane, a sealing lip portion projected from the molding main body portion to the vehicle body panel for shielding the gap from an exterior direction in a state in which the window molding is attached to the gap of the vehicle body panel and a folded-back lip portion folded back at a free end portion of the sealing lip portion to be brought into elastic contact with an outer face of the vehicle body panel. At least one of back faces of the sealing lip portion and the folded-back lip portion, sticking prevention means for preventing the back faces from sticking to each other is formed at a portion of overlapping the sealing lip portion and the folded-back lip portion.

18 Claims, 9 Drawing Sheets

U.S. PATENT DOCUMENTS

| | | | | |
|---|---|---|---|---|
| 5,248,179 A | * | 9/1993 | Biermacher et al. | 296/93 |
| 5,536,537 A | | 7/1996 | Mizushima | |
| 5,688,016 A | * | 11/1997 | Gold | 296/93 |
| 6,017,038 A | * | 1/2000 | Wato et al. | 296/93 |
| 6,814,385 B2 | * | 11/2004 | Fujiwara | 296/93 |
| 7,059,656 B2 | * | 6/2006 | Mikkaichi et al. | 296/93 |
| 7,210,729 B2 | * | 5/2007 | Hammaker et al. | 296/93 |
| 2003/0075947 A1 | * | 4/2003 | Fujiwara | 296/93 |

FOREIGN PATENT DOCUMENTS

| | | |
|---|---|---|
| EP | 0819560 A1 | 1/1998 |
| JP | 58-108914 | 7/1983 |
| JP | 08-113039 | 5/1996 |
| JP | 10-35272 | 2/1998 |
| JP | HEI 10-35272 | 2/1998 |
| JP | 10-151943 | 6/1998 |
| JP | 10-244830 | 9/1998 |

* cited by examiner

WINDOW EDGE MOLDING FOR MOTOR VEHICLE

TECHNICAL FIELD

The present invention relates to a vehicular window molding for sealing a gap between a window pane attached to a window opening edge of a vehicle body panel and the vehicle body panel.

BACKGROUND ART

There is an example of a window molding disclosed in JP-A-10-35272. FIG. 1 is a perspective view of a portion of a vehicle V in a state of attaching a window molding along a gap between a window pane on a front side of the vehicle and a vehicle body panel. FIG. 8 is a sectional view of a conventional window molding M' showing a state of attaching the window molding M' to a window pane G. The window molding M' is attached to peripheral edge portions of an upper edge and two side edges of the windowpane G on the front side of the vehicle. The window molding M' covers gaps between the upper edge and the both side edges of the window pane G and a roof panel and both front pillar panels of a vehicle body panel B. The window molding M' includes a plurality of molding portions extending longitudinally, each attached to the upper edge or the side edge of the window pane G. The molding portion attached to the upper edge of the window pane G and the molding portion attached to the side edge of the window pane are connected at a corner portion Gc of the window pane G. In a state of being attached to the vehicle, viewed from a front side, the window molding M' has an inverse U-like shape as a whole but slightly widened towards an opening in the U-like shape. Further, in the following explanation, so far as not described particularly, "exterior direction" indicates an outer side of the vehicle in a direction of the thickness of the window pane G, and "interior direction" indicates a side of a vehicle compartment in a direction of the thickness of the window pane G. Further, "outward direction" and "inward direction" indicate directions along a window pane face, a direction of being remote from a center of the surface of the window pane G is referred to as "outward direction" and a direction reverse thereto is referred to as "inward direction" (refer to FIG. 3). The window molding M' is provided with a molding main body portion 30, a shielding lip portion 40' and a folded-back lip portion 50'. The molding main body portion 30 is attached to an outer peripheral edge portion 11 of the window pane G while pinching the outer peripheral edge portion 11. The shielding lip portion 40' shields exterior direction of a gap 1 between the outer peripheral edge portion 11 and the vehicle body panel B. The folded-back lip portion 50' is formed to fold back at a distal end portion of the shielding lip portion 40' and is brought into elastic contact with an outer face of the vehicle body panel B.

A simple explanation will be given with regard to a sporadic occurrence mechanism of noise when the window molding M' includes the folded-back lip portion 50' with reference to FIG. 1 and FIG. 9. When the vehicle travels at high speed, on an outer side of the window molding M', air impinging on the window pane G flows at velocity $V_1$ substantially equal to vehicle speed. Meanwhile, on an inner side of the window molding M', air entering into the gap 1 from around a hood or a fender flows at comparatively slow velocity $V_2$. When comparing outer pressure $P_1$ on the exterior direction of the window molding M' and inner pressure $P_2$ on the interior direction of the window molding M', the inner pressure $P_2$ becomes larger than the outer pressure $P_1$ ($P_2>P_1$) by the air flow. An air pressure difference ($P_2-P_1$) thereof acts on the sealing lip portion 40' as a force in the exterior direction. When the force becomes larger than an elastic recovery force $F_1$ of the field lip portion 40', a free end portion 42' of the sealing lip portion 40' is floated up from the gap 1. Therefore, air on the interior direction of the window molding M' is sucked out to the exterior direction. When there is not the air pressure difference ($P_2-P_1$), the free end portion 42' of the sealing lip portion 40' stops floating up. A pressure variation produced when air on the interior direction of the window molding M' is sucked out to the exterior direction causes self-excited vibration of the sealing lip portion 40'. The self-excited vibration of the sealing lip portion 40' is heard by a passenger at the interior direction as noise and therefore, gives unpleasant feeling to the passenger. When the window molding M' includes the folded-back lip portion 50', air at the interior direction is prevented from being sucked out to the exterior direction and sporadic occurrence of the noise is prevented. However, when the window moldings attached to a number of unspecified vehicles, there is a concern of occurring the noise owing to a difference in a shape of a portion of the window molding attached to the vehicle.

The inventors have investigated in details not only on a partial constitution of the vehicle attached with the window molding M' but also on fabricating steps thereof in order to find out cause of sporadically occurring the noise. Meanwhile, the window molding M' is attached to the vehicle body panel B in accordance with the following steps. (1) A dam rubber 12 is provided at a position on an inner side of the outer peripheral edge portion 11 at a back face of the window pane G by a predetermined dimension by a predetermined method. The dam rubber 12 is provided in a ring-like shape along the gap between the window pane G and the vehicle body panel B and is projected from the back face of the window pane. The window molding M' is attached to the outer peripheral edge portion 11 of the window pane G to pinch the outer peripheral edge portion 11 by attaching a fitting groove 31 of the molding main body portions 30 to the outer peripheral edge portion 11. The dam rubber 12 is for preventing a sealing material (adhering agent) 13 from flowing out. (2) Next, in an assembling line of the vehicle, the sealing material (adhering agent) 13 is injected in a string-like shape to coat on the back face of the window pane G along an outer periphery of the dam rubber 12. (3) The window pane G is arranged to an window opening 21 of the vehicle body panel B such that the free end portion 42' of the sealing lip portion 40' in a bow-like shape of the window molding M' is brought into contact with an outer face of the vehicle body panel B and is elastically deformed in the exterior direction. Further, the window pane G is brought into contact with a window opening edge portion 24 of the vehicle body panel B while compressing the sealing material (adhering agent) 13. Under the state, the sealing material (adhering agent) 13 is cured to fixedly adhered thereto. In this way, the window pane G is attached to the vehicle body panel B.

In the state of attaching the window pane G to the vehicle body panel B in this way, the gap 1 is formed between an inclined peripheral wall portion 23 continuous to the window opening edge portion 24 of the vehicle body panel B and the outer peripheral edge portion 11 of the window pane G to which the molding main body portion 30 is attached to fit. The sealing lip portion 40' is arranged to shield the gap 1 from the exterior direction. In a normal attaching state, an opposed face of the sealing lip portion 40' is opposed to an opposed face of the folded-back lip portion 50'. The folded-back lip portion 50' and the sealing lip portion 40' are elastically deformed such that the opposed face of the folded-back lip portion 50' and the opposed face of the sealing lip portion 40' become close to each other. The opposed face of the folded-back lip portion 50' is arranged to be lightly brought into contact with the opposed face of the sealing lip portion 40' or to maintain a small gap from the opposed face of the sealing lip portion 40'. In this way, the folded-back lip portion 50' is brought into elastic contact with the outer face of the vehicle body panel B.

Meanwhile, shapes of respective parts of the vehicle body panel, the window molding, the window pane and the like are scatter within ranges of allowable tolerances. When the respective parts are combined to use, there is a possibility that the window panel is attached to the vehicle body panel in a state in which the folded-back lip portion of the window molding is brought into press contact with the sealing lip portion by accumulation of error. It is estimated that when the state of bringing the folded-back lip portion into press contact with the sealing lip portion continues for a long period of time, the opposed faces of the two lip portions are viscously adhered (or adhered) to each other to bring about a state of being similar to a single lip portion as if the two lip portions were integrated. In this case, it seems that similar to a state in which the window molding M' is not formed with the folded-back lip portion 50' as shown by a two-dotted chain line in FIG. 9, when the air pressure difference $(P_2-P_1)$ becomes larger than the elastic recovery force $F_1$ of the free end portion 42' of the sealing lip portion 40', the above-described noise is emitted. The viscous adherence (or adherence) of the sealing lip portion and the folded-back lip portion is brought about owing to accuracy and integration accuracy of the respective part shapes. Therefore, it is also conceivable to resolve the viscous adherence (or adherence) of the sealing lip portion and the folded-back lip portion by improving the accuracy and the integration accuracy of the part shapes. However, there is a possibility of posing problems of an increase in product cost, a reduction in productivity and the like. Further, the viscous adherence or the adherence is estimated to be caused by a material of the sealing lip portion and the folded-back lip portion.

It is an object of the invention to provide a window molding formed with a folded-back lip portion capable of preventing sporadic occurrence of noise.

DISCLOSURE OF THE INVENTION

To achieve the above-described object, the invention provides a vehicular window molding characterized in comprising a molding main body portion attached to an outer peripheral edge portion of a window pane arranged at inside of an opening portion provided at a vehicle body panel, a sealing lip portion integrally formed with the molding main body portion and projected to the vehicle body panel in a state of attaching the molding main body portion to the outer peripheral edge portion of the window pane, and a folded-back lip portion formed integrally with a distal end portion of the sealing lip portion and brought into elastic contact with an outer face of the vehicle body panel by being folded back at the distal end portion, wherein respectives of the sealing lip portion and the folded-back lip portion are provided with opposed faces opposed to each other and at least one of the opposed face of the sealing lip portion and the opposed face of the folded-back lip portion is provided with a sticking prevention portion for preventing the one from being adhered to other thereof.

According to the vehicular window molding, the sticking prevention portion is formed at the opposed faces of the sealing lip portion and the folded-back lip portion. Thereby, the opposed faces of the sealing lip portion and the folded-back lip portion are prevented from sticking to each other, or even when the opposed faces are adhered to each other, a force of adhering the opposed faces becomes smaller than elastic recovery force of the folded-back lip portion and therefore, the opposed faces are separated from each other. As a result, even when a free end portion of the sealing lip portion and a base end portion of the folded-back lip portion are separated to displace from the vehicle body panel to the exterior direction, the folded-back lip portion is going to recover to a shape thereof in a free state by the elastic recovery force of its own. In this way, the free end portion of the folded-back lip portion maintains a state of being brought into close contact with the outer face of the vehicle body panel. Therefore, air at inside of the gap is prevented from leaking to outside of the sealing lip portion and sporadic occurrence of noise caused by leaking air is effectively prevented.

Preferably, the sticking prevention portion includes a projection provided on at least one of the opposed face of the sealing lip portion and the opposed face of the folded-back lip portion and projected to other of the opposed face of the sealing lip portion and the opposed face of the folded-back lip portion.

Therefore, at a portion of overlapping the sealing lip portion and the folded-back lip portion, a substantial area of bringing the opposed faces of the two lip portions into contact with each other is reduced and therefore, a force of adhering the two members caused by the contact is reduced. Therefore, even when the opposed face of the sealing lip portion and the opposed face of the folded-back lip portion are brought into press contact with each other, the opposed face of the sealing lip portion and the opposed face of the folded-back lip portion are separated from each other by the elastic recovery force of the folded-back lip portion. Thereby, a state of bringing the free end portion of the folded-back lip portion into close contact with the outer face of the vehicle panel is firmly maintained and reliability for prevention of sporadic occurrence of noise is enhance.

Preferably, the vehicular window molding is extended to be long and the projection is a projected streak extended in a longitudinal direction of the vehicular window edge plate.

Therefore, in the portion of overlapping the sealing lip portion and the folded-back lip portion, function of preventing the sticking between the sealing lip portion and the folded-back lip portion or function of reducing the adhering force is worked uniformly along the longitudinal direction. Thereby, the sealing lip portion and the folded-back lip portion are separated from each other over an entire length of the vehicular window molding and sporadic occurrence of noise is restrained. Further, when a shape of a cross-sectional face thereof is the same over the entire length of the vehicular window molding, the projected streak can simply be formed simultaneously in extruding the window molding.

Preferably, the sticking prevention portion includes a sticking prevention layer, the sticking prevention layer is provided at one of the opposed face of the sealing lip portion and the opposed face of the folded-back lip portion, and the sticking prevention layer is formed by a material which is not adhered to other of the opposed face of the sealing lip portion and the opposed face of the folded-back lip portion.

The sticking prevention layers may be provided to both of the opposed face of the sealing lip portion and the opposed face of the folded-back lip portion. In this case, the sticking prevention layers are formed by materials having properties of not adhering to each other.

According to the window moldings, the opposed faces of the sealing lip portion and the folded-back lip portion can be prevented from adhering to each other without forming a projection or a projected streak. Further, since the projection or the projected streak may not be formed, a cavity shrinkage can be prevented from being brought about at a surface of the sealing lip portion.

Preferably, the folded-back lip portion includes a distal end portion and a predetermined pressure acting clearance is formed between the distal end portion of the folded-back lip portion and the opposed face of the sealing lip portion in a state in which the opposed face of the sealing lip portion and the opposed face of the folded-back lip portion are brought into elastic contact with each other.

At the portion of overlapping the sealing lip portion and the folded-back lip portion to be brought into contact with each other, in running a vehicle, pressure at the interior direction is firstly exerted to the pressure acting clearance (space) between the distal end portion (free end portion) between the folded-back lip portion and the opposed face of the sealing lip portion opposed thereto. The pressure is exerted as a force of separating the sealing lip portion and the folded-back lip portion and therefore, the shield portion and the folded-back lip portion are firmly separated from each other. By forming the pressure acting clearance capable of operating the inner pressure in this way, the inner pressure can be exerted between the sealing lip portion and the folded-back lip portion in addition to the elastic recovery force of the folded-back lip portion. Thereby, the sealing lip portion and the folded-back lip portion can firmly be separated from each other. Further, the free end portion of the return lip portion can firmly be brought into close contact with the outer face of the vehicle body panel. Therefore, sporadic occurrence of noise can effectively be prevented.

Figure 1:
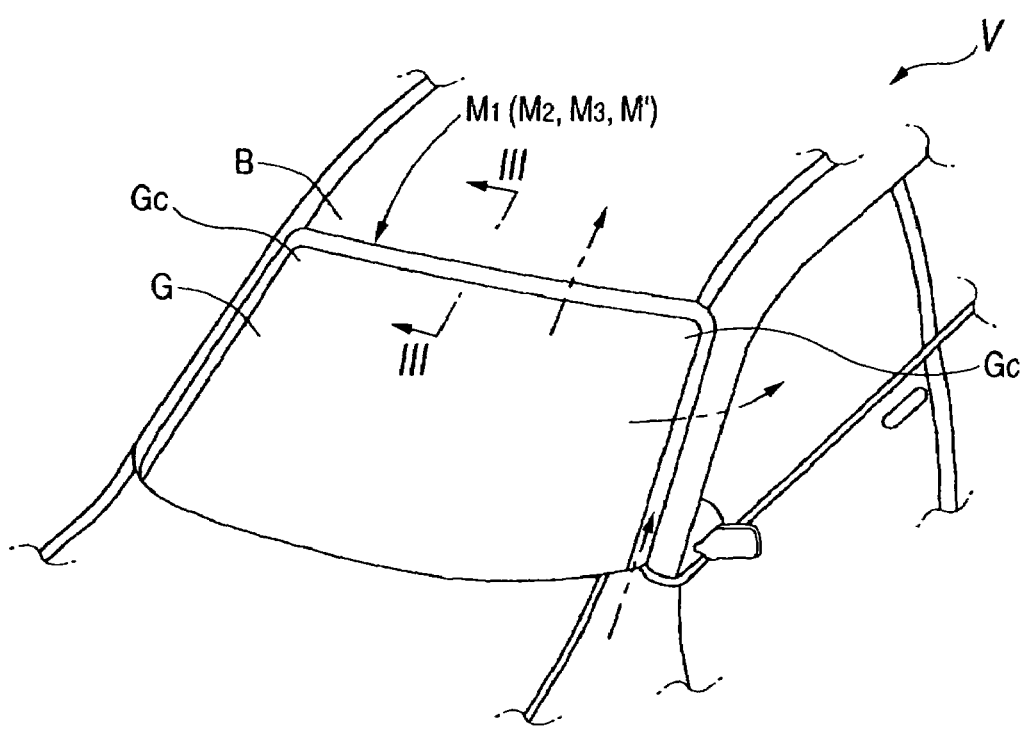
FIG. 1 is a perspective view of a portion of a vehicle showing a state of attaching a window molding along a gap between a window pane on a front side of the vehicle and a vehicle body panel.

Further, in notations in the drawings, notation B designates a vehicle body panel, notation G designates a window pane, notations from $M_1$ to $M_4$ designate window moldings, notation 1 designates a clearance between a peripheral edge portion of a window pane and a vehicle body panel, notation 21 designates a window opening, notations 30 and 70 designate molding main body portions, notation 40 designates a sealing lip portion, notation 44 designates a trapezoidal projected streak (sticking prevention means), notation 50 designates a folded-back lip portion, notation 54 designates a triangular projected streak (sticking prevention means), notations 56 and 66 designate pressure acting clearances, and notation 64 designates a nonadhering layer (sticking prevention means).

BEST MODE FOR CARRYING OUT THE INVENTION

Figure 2:
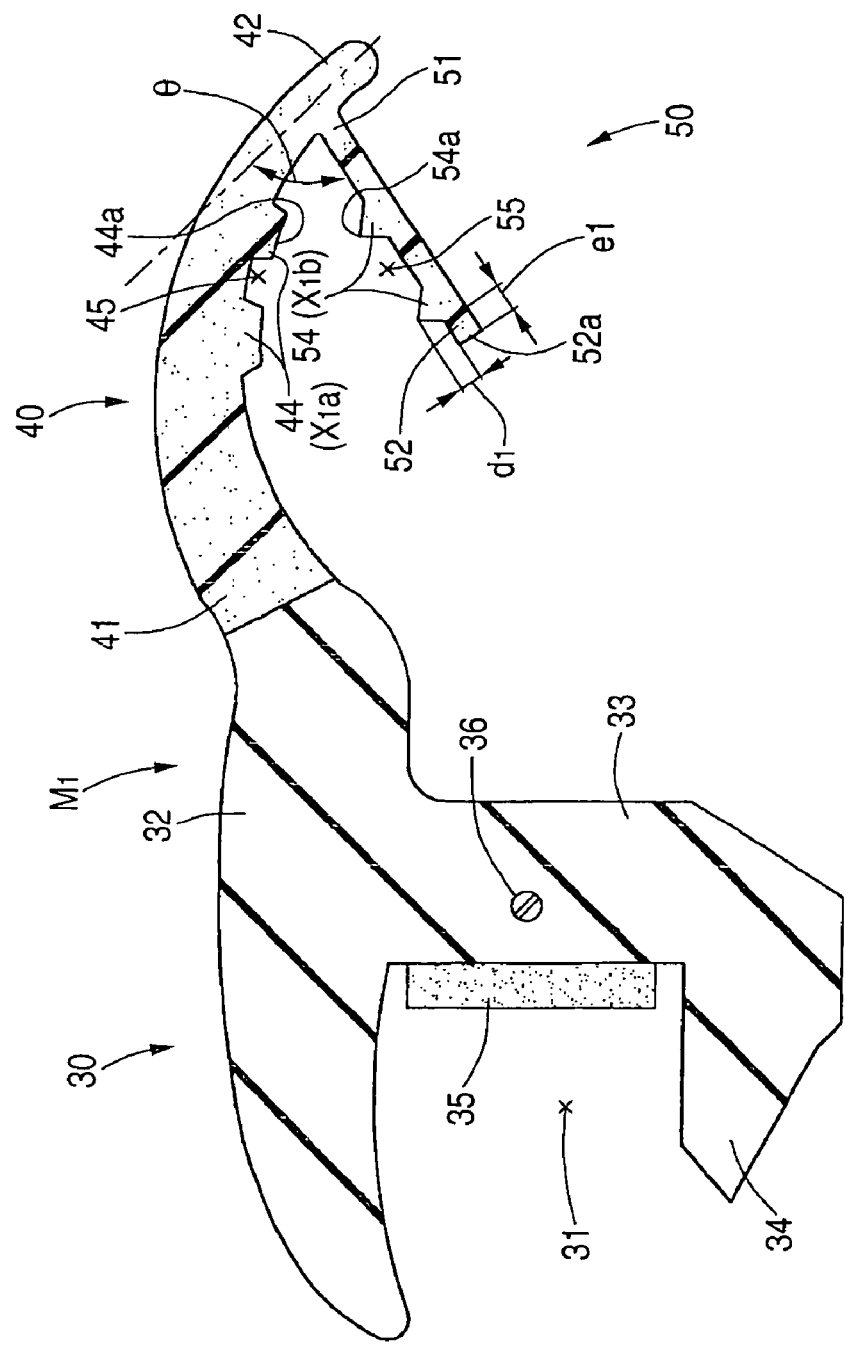
FIG. 2 is a cross-sectional view of a window molding according to a first embodiment.
Figure 3:
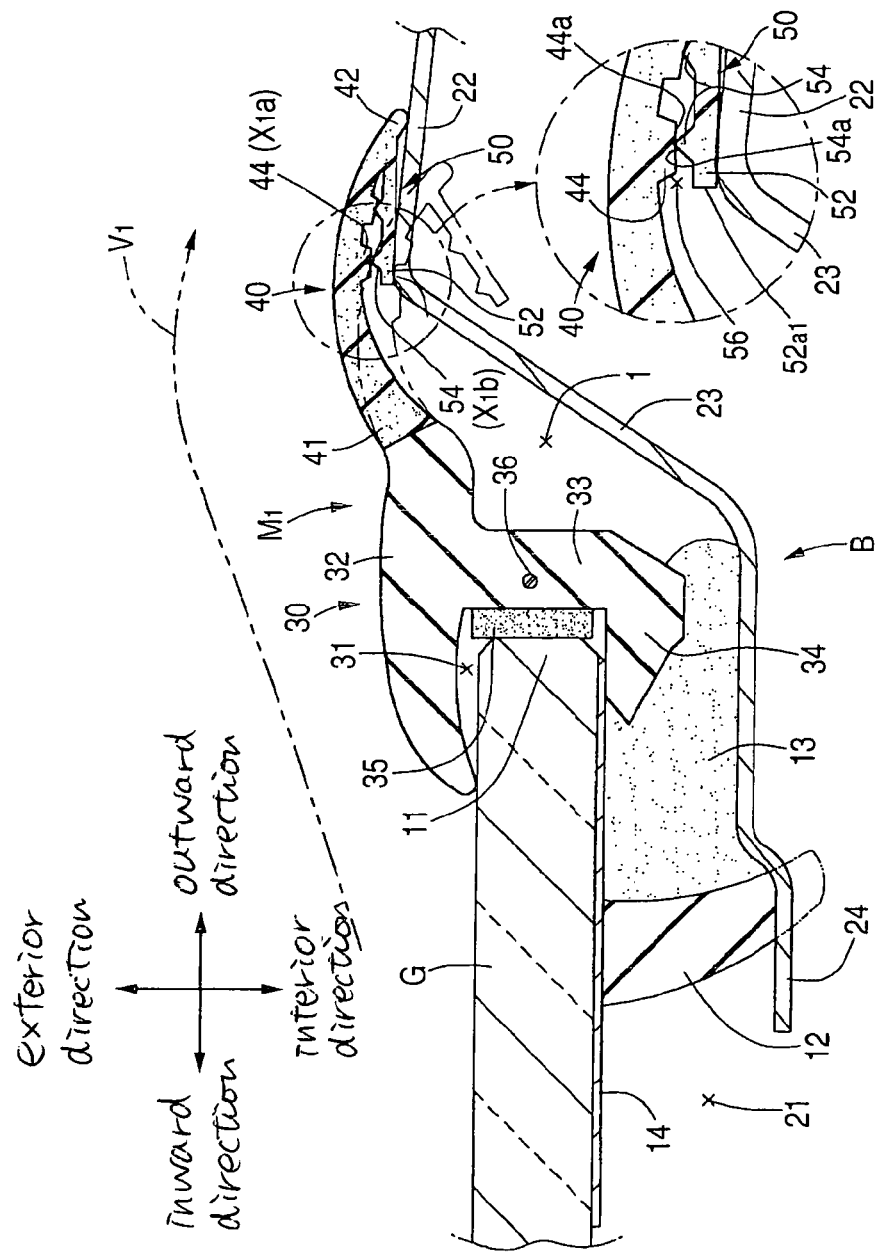
FIG. 3 is a sectional view taken along a line III-III of FIG. 1 and is a view showing a state of covering a gap by the window molding attached to a peripheral edge of the window panel.
Figure 4:
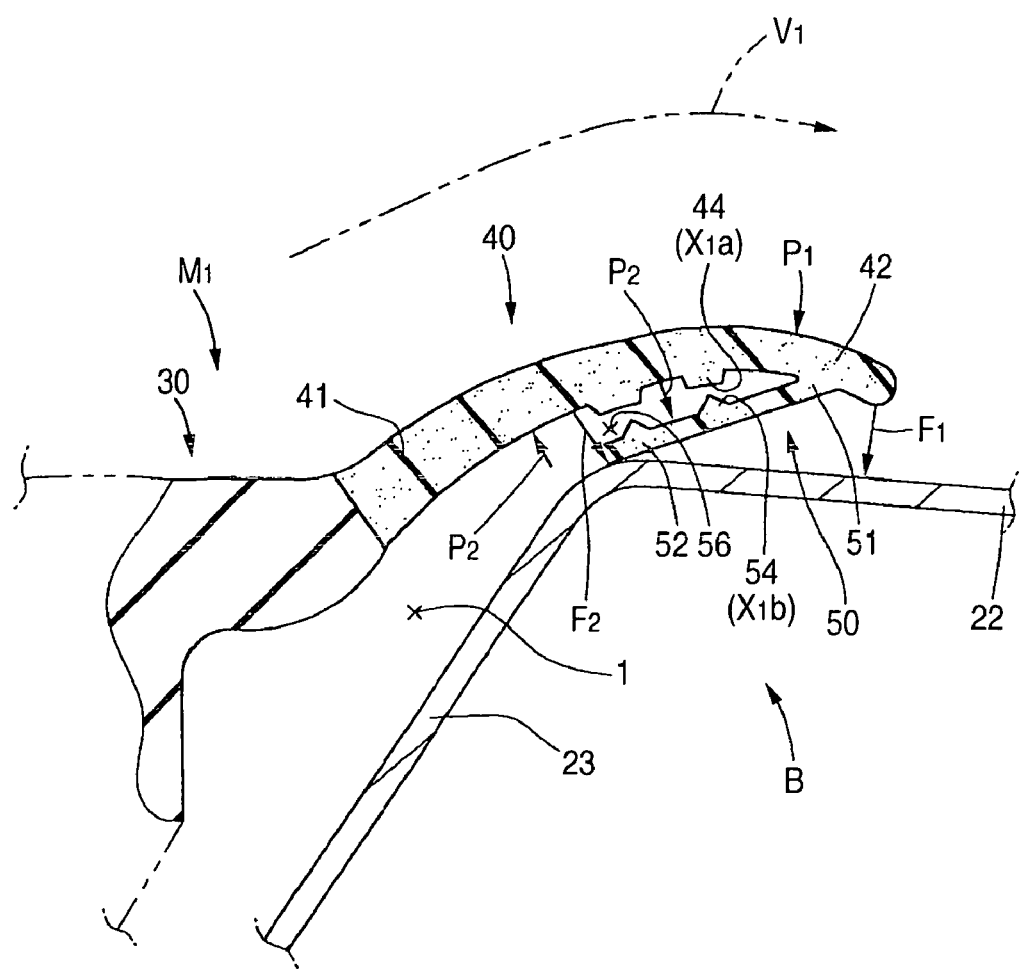
FIG. 4 is a sectional view of a portion of a window molding showing a state in which a sealing lip portion and a folded-back lip portion of the window molding are separated from each other to achieve sealing function when a difference between pressures at an outer portion and an inner portion is increased.

A first embodiment according to the invention will be explained in reference to FIG. 1 through FIG. 4 as follows. FIG. 2 is a cross-sectional view of a free state of the window molding $M_1$ according to the first embodiment. FIG. 3 is a sectional view in a state in which the gap 1 is covered by the window molding $M_1$ attached to a peripheral edge of the window pane G (sectional view taken along a line III-III of FIG. 1). A two-dotted chain line in FIG. 3 indicates a lip shape in the free state. FIG. 4 is a sectional view of a portion of the window molding $M_1$ in a state in which a difference between respective pressures $P_1$ and $P_2$ of an outer portion and an inner portion is increased. In FIG. 4, the sealing lip portion 40 and the folded-back lip portion 50 are separated from each other to seal the gap 1 to prevent air from leaking out. As shown by FIG. 1, the window molding $M_1$ according to the embodiment is attached along the gap 1 between the upper edge of the window pane G on the front side of the vehicle and the roof panel of the vehicle of the panel B. Further, "exterior direction", "interior direction", "outward direction" and "inward direction" follow the above-described explanation.

The window molding $M_1$ is extended to be long. According to the embodiment, the window molding $M_1$ is formed with the same cross-sectional face shape over an entire length thereof and is fabricated by extrusion. The window molding $M_1$ is formed substantially in a U-like shape in view of a cross-sectional face thereof. The window molding $M_1$ includes the molding main body portion 30 for pinching the outer peripheral edge portion 11 of the window pane G, the sealing lip portion 40 having a cross-sectional shape in a shape of a bent plate for shielding the gap 1, and the folded-back lip portion 50 having a cross-sectional shape in a shape of a thin plate for being brought into elastic contact with the outer face of the vehicle body panel B. Here, a portion of the vehicle body panel B to be brought into elastic contact with the folded-back lip portion 50 is a front wall portion 22 exposed to the exterior direction. Further, materials of forming the molding main body portion 30 and forming the sealing lip portion 40 and the folded-back lip portion 50 are provided with hardnesses different from each other relatively. The molding main body portion 30 is formed by an elastic material harder than the sealing lip portion 40 and the folded-back lip portion 50. The sealing lip portion 40 and the folded-back lip portion 50 are formed by an elastic material softer than the molding main body portion 30.

The molding main body portion 30 is formed with the fitting groove 31 to be fitted to the outer peripheral edge portion 21 while pinching the outer peripheral edge portion 11 of the window pane G. An ornamental portion 32 which is the edge portion exposed to the exterior direction, a leg portion 33 and an engagement portion 34 are integrally formed along a longitudinal direction of the window molding $M_1$. An end portion on the exterior direction of the leg portion 33 is integrally formed with a substantially central portion in a width direction of the ornamental portion 32. An end portion on the interior direction of the leg portion 33 is integrally formed with the engagement portion 34 to project in the inward direction. A bottom face of the fitting groove 31 is pasted with a double faced (pressure sensitive) adhesion tape 35 for viscously adhering to an end face of the outer peripheral edge portion 11 of the window pane G. A central portion of the leg portion 33 is embedded with a core member 36 comprising a metal line for preventing the window molding $M_1$ from being elongated and contracted. Further, notation 14 in FIG. 3 designates a portion of an opaque coloring layer of the window pane G.

The sealing lip portion 40 is formed in a bow-like shape in view of a cross-sectional face thereof. The sealing lip portion 40 is provided with a bow-like shape bent to the exterior direction, is integrally formed with a fixed base end portion 41 as described later, and projects in the outward direction from the base end portion 41 toward the free end portion 42 at the distal end. The fixed base end portion 41 is integrally bonded to an outer side end portion of the ornamental portion 32 of the molding main body portion 30. The free end portion 42 is elastically deformed from a position indicated by a two-dotted chain line in the exterior direction with the fixed base end portion 41 as a fulcrum in a state of bringing a distal end portion thereof into elastic contact with the front wall portion 22 of the vehicle body panel B. Further, the folded-back lip portion 50 is folded back to the inner side to be integrally formed with the portion of the free end portion of the sealing lip portion 40. Further, a back face (opposed face) of the sealing lip portion 40 is formed with two pieces of trapezoidal projected streaks 44 to interpose a recess groove 45. The trapezoidal projected streak 44 is formed over an entire length of the window molding $M_1$ along the longitudinal direction and functions as sticking prevention means $X_1a$. Each trapezoidal projected streak 44 is formed at a portion opposed to the back face (opposed face) of the folded-back lip portion 50 in a state of folding back the folded-back lip portion 50. The trapezoidal projected streak 44 is formed substantially in a trapezoidal shape in view of a cross-sectional face thereof. A partial contact face thereof on the interior direction constitutes a top face of the trapezoidal shape and can be brought into contact with a distal end edge of sticking prevention means $X_{1b}$, mentioned later, formed at a back face of the folded-back lip portion 50.

The folded-back lip portion 50 includes a fixed base end portion 51. The fixed base end portion 51 is positioned to slightly set back from the distal end portion of the free end portion 42 of the sealing lip portion 40. The folded-back lip portion 50 is folded back at the fixed base end portion 51 by an intersecting angle θ to the interior direction and in the inward direction. The folded-back lip portion 50 can be folded back toward the back face of the sealing lip portion 40 in attaching operation. The folded-back lip portion 50 is formed in a thin-walled shape more than the sealing lip portion 40. This is for enabling to elastically deform the folded-back lip portion 50 by a force smaller than that required for elastically deforming the sealing lip portion 40. Thereby, when the window molding $M_1$ is attached to the vehicle body panel B, the free end portion 42 of the sealing lip portion 40 is prevented from being separated (floated up) from the outer face of the vehicle body panel B without being brought into elastic contact therewith and therefore, a gap for blowing air therethrough can be prevented from being produced at an interval thereof from the vehicle body panel B. Further, when the window molding $M_1$ is attached to the vehicle body panel B, in a state in which a free end portion 52 thereof is elastically deformed in a direction of approaching the back face of the sealing lip portion 40 (exterior direction), a length of the folded-back lip portion 50 in a width direction is determined such that the free end portion 52 is brought into elastic contact with the outer face of the front wall portion 22 on an outer side of the inclined peripheral wall portion 23 of the vehicle body panel B.

Further, at a middle portion of the back face of the folded-back lip portion 50 excluding the fixed base end portion 51 and the free end portion 52, as the sticking prevention means $X_{1b}$, two pieces of triangular projected streaks 54, 54 are formed along the longitudinal direction of the window molding $M_1$. As a result, a recess groove 55 is formed between two pieces of the triangular projected streaks 54, 54. As shown by FIG. 2, one of two pieces of the triangular projected streaks 54, 54 formed on the side of the free end portion 52 of the folded-back lip portion 50 is formed on an inner side (a side of the fixed base end portion) of the distal end of the free end by a length $e_1$. As a result, a stepped difference $d_1$ is formed between the back face of the folded-back lip portion 50 and a distal end edge of each of the triangular projected streaks 54, 54 formed at the back face. Since the back face of the folded-back lip portion 50 is formed with two pieces of the triangular projected streaks 54, 54, when the window molding $M_1$ is attached to the vehicle body panel B as shown by FIG. 3, the back faces of the folded-back lip portion 50 and the sealing lip portion 40 are brought into elastic contact with each other while forming a pressure acting clearance 56 therebetween (refer to FIG. 3). At the sticking prevention means $X_{1a}$, when the folded-back lip portion is folded back, a linear contact edge 54a which is the distal end edge of each triangular projected streak 54 can be brought into contact with the partial contact face 44a substantially in a linear shape along the longitudinal direction of the window molding $M_1$.

Further, a supplemental explanation will be given of the intersecting angle θ between the sealing lip portion 40 and the folded-back lip portion 50 in a natural state. The intersecting angle θ is not particularly limited so far as the angle is an angle by which the free end portion 52 of the folded-back lip portion 50 is initially brought into contact with the outer face of the vehicle body panel B by an intersecting angle equal to or smaller than angle 90° and the folded-back lip portion 50 is not opened in the outward direction when the window molding $M_1$ is attached to the vehicle body panel B. Practically, 20° through 150° is applicable as the intersecting angle θ. The angle is preferably 30° through 120°, most preferably, 45° through 100°.

Next, an explanation will be given of materials of respective portions of the molding main body portion 30, the sealing lip portion 40 and the folded-back lip portion 50. Although a material of forming the molding main body portion 30 is not particularly limited, a material having hardness to a degree of not impairing a paint layer of the vehicle body panel B or the window pane G in operation of attaching the window molding $M_1$ to the vehicle body panel B or in using the vehicle. Although a metal profile can also be used as the material of forming the molding main body portion 30, it is preferable to use rubber, synthetic resin, or elastomer. According to the embodiment, the molding main body portion 30 is formed by semihard through hard polyvinyl chloride having HDA of about 60 through 95°. On the other hand, it is preferable to form the sealing lip portion 40 and the folded-back lip portion 50 by a material which is soft and more elastic than the molding main body portion 30 and rubber, synthetic resin, or elastomer or the like is used. Thermoplastic elastomer or rubber is particularly preferable. According to the embodiment, a material is formed by chlorinated ethylene polymer resin having HDA of about 30 through 55°.

Further, respective portions of the molding main body portion 30, the sealing lip portion 40 and the folded-back lip portion 50 constituting the window molding $M_1$ can simultaneously be formed by coextrusion. Further, the window molding $M_1$ is provided with the same cross-sectional face shape over the entire length and therefore, the respective projected streaks 44 and 54 can simply be formed simultaneously in extruding the window molding $M_1$. Thereby, an improvement in productivity can be achieved. Further, as a representative example of thermoelastic elastomer, respective thermoplastic elastomers of olefin species and styrene species and vinyl species are pointed out. As trade names of olefin species on sale, there are "SANTOPRENE" of Advanced Elastomer Systems Japan Ltd., "MILAS-TOMER" of Mitsui Chemicals, Inc., "LEOSTOMER" of Riken Technos, Corp. and the like. Further, as trade names of chlorinated ethylene copolymer resin on sale, there are "ALCRYN" of DuPont-Mitsui Polychemicals Co., Ltd. and the like.

Next, an explanation will be given as to operation and effect when the window molding $M_1$ is attached to the vehicle body panel B. As described above, for example, there is a case in which the vehicle is assembled by a combination of a specific member in which a dimension of a stepped difference between the window opening edge portion 24 and the front wall portion 22 is deviated to an upper limit of an allowable tolerance and a specific member in which an angle of projecting the sealing lip portion 40 of the window molding $M_1$ is deviated to a lower limit of an allowable tolerance. In this case, the window molding $M_1$ is attached thereto in a state in which the back face of the folded-back lip portion 50 is brought into press contact with the back face of the sealing lip portion 40. The state continues thereafter. The state of bringing the sealing lip portion 40 and the folded-back lip portion 50 into press contact with each other in this way can be brought about owing to "dispersion" of accuracy of integrating the window pane G attached with the window molding $M_1$ and the dam rubber 12 to the window opening 21 of the vehicle body panel B.

The respective back faces of the sealing lip portion 40 and the folded-back lip portion 50 opposed to each other in the state of bringing the sealing lip portion 40 and the folded-back lip portion 50 into press contact with each other are formed with pairs of the projected streaks 44 and 54 having sections in the trapezoidal shape and the triangular shape as the sticking prevention means $X_1a$ and $X_1b$. Therefore, although the respective shield and folded-back lip portions 40 and 50 are strongly brought into press contact with each other, there is brought about a state in which respectives of the partial contact faces 44a and the linear contact edges 54a of the respective projected streaks 44 and 54 are brought into partial contact with each other substantially in the linear shape along the longitudinal direction of the window molding $M_1$. In this case, in comparison with the case in which the sticking prevention means $X_1a$ and $X_1b$ are not formed but the respective back faces of the respective shield and folded-back lip portions 40 and 50 are brought into press contact with each other over the entire face, a substantial contact (press contact) area is reduced. Therefore, a force of adhering the folded-back lip portion 50 and the sealing lip portion 40 is reduced. Further, the free end portion 52 of the folded-back lip portion 50 is formed in a thin-walled shape from the distal end of the triangular projected streak 54 by the stepped difference $d_1$. Therefore, the pressure acting clearance 56 is formed between the back face of the free end portion 52 of the folded-back lip portion 50 and the back face of the sealing lip portion 40 opposed thereto in the state by bringing the sealing lip portion 40 and the folded-back lip portion 50 into press contact with each other.

Further, in traveling of the vehicle, when the inner pressure $P_2$ (>outer pressure $P_1$) is produced on the inner side of the window molding $M_1$, that is, the gap 1, at the portion of bringing the sealing lip portion 40 and the folded-back lip portion 50 into press contact with each other, the inner pressure $P_2$ is initially exerted to the pressure acting clearance 56 between the free end portion 52 of the folded-back lip portion 50 which is disposed on the innermost side and the back face of the sealing lip portion 40 opposed thereto. Further, the inner pressure $P_2$ displaces the sealing lip portion 40 in the exterior direction. Thereby, the folded-back lip portion 50 is displaced in the interior direction to be brought into close contact with the outer face of the front wall portion 22 of the vehicle body panel B. In other words, the inner pressure $P_2$ is exerted as a force of separating the contact portions of the lip portions 40 and 50 in directions opposed to each other.

When the inner pressure $P_2$ is further increased and the air pressure difference which is the difference $(P_2-P_1)$ between the inner pressure and the outer pressure becomes larger than the elastic recovery force $F_1$ of the sealing lip portion 40, the sealing lip portion 40 is elastically deformed to the exterior direction with the fixed base end portion 41 as a fulcrum and the free end portion 42 is separated from the vehicle body panel B. Although the fixed base end portion 51 of the folded-back lip portion 50 is elastically deformed in the exterior direction along with the free end portion 42, since the free end portion 52 is also exerted with the inner pressure $P_2$ in addition to the elastic recovery force $F_2$, the free end portion 52 is elastically deformed to a side of a free state with the fixed base end portion 51 as a fulcrum and is brought into close contact with the outer face of the front wall portion 22 of the vehicle body panel B.

By reducing the contact area of the sealing lip portion 40 and the folded-back lip portion 50 in this way, sticking force between the sealing lip portion 40 and the folded-back lip portion 50 can be made smaller than the elastic recovery force of the folded-back lip portion 50. Thereby, the sealing lip portion and the folded-back lip portion 50 can be separated from each other. Further, since the pressure acting clearance 56 is formed for operating the inner pressure $P_2$, the free end portion 52 of the folded-back lip portion 50 can be exerted with the inner pressure $P_2$ along with the elastic recovery force $F_2$ and the sealing lip portion 40 and the folded-back lip portion 50 can further firmly be separated from each other. Thereby, the folded-back lip portion 50 can be brought into close contact with the outer face of the vehicle body panel B. As a result, even when the window molding $M_1$ is attached thereto in the state of bringing the sealing lip portion 40 and the folded-back lip portion 50 into press contact with each other, by the air pressure difference $(P_2-P_1)$ produced in running the vehicle, air at the gap 1 can be prevented from leaking to outside. Therefore, it can be prevented that the self-excited vibration of the lip portion is heard as noise. Further, since the sticking prevention means $X_1a$ and $X_1b$ are formed over the entire length of the window molding $M_1$, at an entire length of overlapping the sealing lip portion 40 and the folded-back lip portion 50 along the longitudinal direction of the window molding $M_1$, functions of the sealing lip portion 40 and the folded-back lip portion 50 for preventing sticking with each other are worked uniformly. Therefore, sporadic occurrence of noise can effectively be restrained over the entire length of the vehicular window molding $M_1$.

According to the first embodiment, there has been shown an example of forming the sticking prevention means $X_1a$ and $X_1b$ respectively for both of the sealing lip portion 40 and the folded-back lip portion 50. However, the object of the invention can be achieved when the sticking prevention means $X_1a$ and $X_1b$ are formed on at least either one of the sealing lip portion 40 and the folded-back lip portion 50 and the substantial contact area of the back faces of the sealing lip portion 40 and the folded-back lip portion 50 is reduced. Further, when the wall thickness of the sealing lip portion is thin and the projected streak is formed on the back face, there is a case of bringing about influence of the projected streak (typically, "shrinkage cavity") at a surface thereof. In such a case, it is preferable to form the projected streak only at the back face of the folded-back lip portion 50. Then, irregularities caused by the "shrinkage cavity" or the like are not brought about on the surface of the sealing lip portion and ornamental performance thereof can be maintained.

Although according to the embodiment, the sticking prevention means $X_1a$ and $X_1b$ include two pieces of the trapezoidal projected streaks 44 and two pieces of the triangular projected streaks 54, the sticking prevention means $X_1a$ and $X_1b$ are not limited in numbers of pieces of the projected streaks and respective cross-sectional shapes of the trapezoidal shape and the triangular shape according to the embodiment. Further, the sticking prevention means may be a projection or a number of projected portions in a point-like shape as in embossing since the substantial contact area of the back faces of the sealing lip portion and the folded-back lip portion 50 may be reduced. Further, as in an embodiment, mentioned later, the projection or the projected streak portion may be formed by a material which is not provided with adherence performance. In this case, further effective sticking prevention means can be provided.

Figure 5:
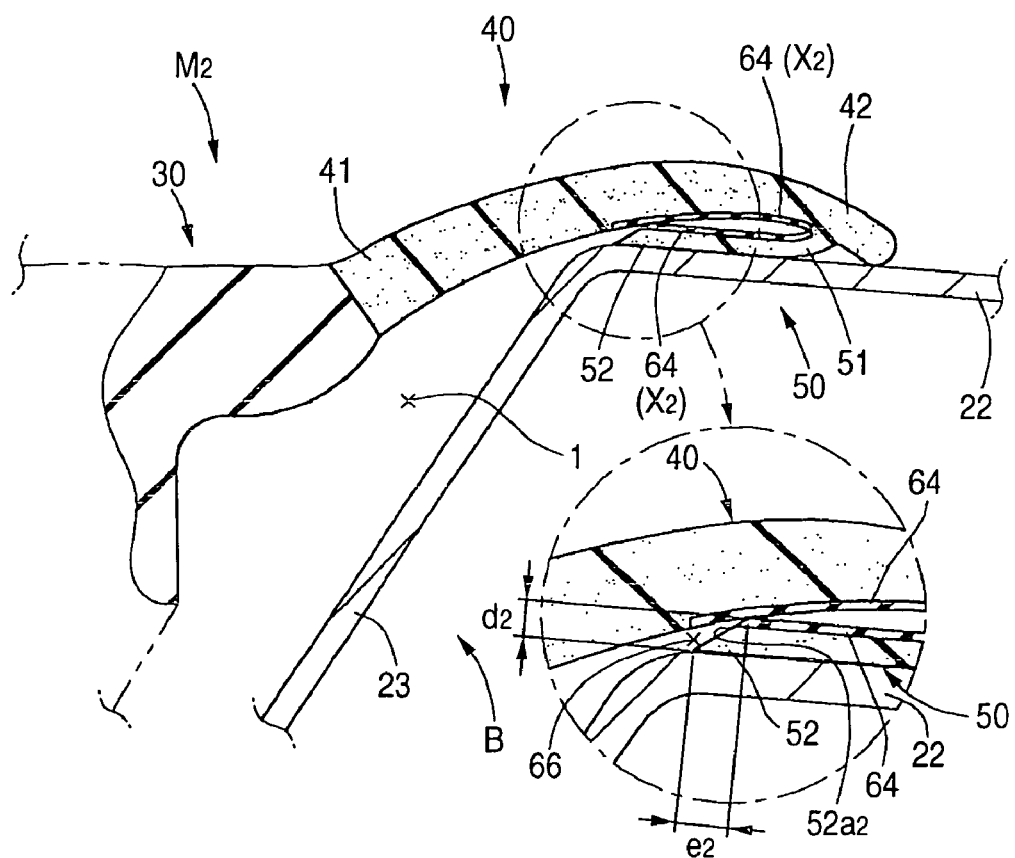
FIG. 5 is a sectional view of a window molding showing a state of covering a gap by attaching the window molding according to a second embodiment to a peripheral edge of a window pane.

Next, an explanation will be given of a second embodiment of the invention in reference to FIG. 5. Further, according to the second through fourth of respective embodiments explained below, portions the same as already-described portions are attached with the same notations. The sticking prevention means $X_2$ formed at the back faces of the sealing lip portion 40 and folded-back lip portion 50 of the window molding $M_2$ according to the second embodiment is formed by a nonadhering layer 64 by which materials of forming the sticking prevention means $X_2$ are difficult to adhere to each other in view of materials thereof. According to the embodiment, the portion mainly differs from that of the already-described embodiment. FIG. 5 is a sectional view of the window molding $M_2$ in a state in which the gap 1 is covered by the window molding $M_2$ according to the second embodiment attached to the peripheral edge of the window pane G. The sealing lip portion 40 and the folded-back lip portion 50 are formed by chlorinated ethylene copolymer resin having HDA of about 30 through 55° similar to the first embodiment. As illustrated, a portion of the back face of the sealing lip portion 40 which can be brought into contact with the hold-back lip portion 50 which is folded back is formed with the nonadhering layer 64 in a shape of a layer. Further, the nonadhering layer 64 is formed also at the back face of the folded-back lip portion 50 by a predetermined depth over the entire face. When the folded-back lip portion 50 and the sealing lip portion 40 are formed by chlorinated ethylene copolymer resin, as a material of forming the nonadhering layer 64, soft vinyl chloride resin mixed with paraffin wax can preferably be used.

Further, an end face $52a_2$ of the free end portion 52 of the folded-back lip portion 50 is constituted by a sharp taper face. A stepped difference $d_2$ in a taper shape is formed at the back face of the folded-back lip portion 50 over a length $e_2$ along the width direction of the folded-back lip portion 50. As a result, in a state in which the folded-back lip portion 50 is folded back and the back face is brought into contact with the sealing lip portion 40, a pressure acting clearance 66 is formed between the back face of the free end portion 52 and the back face of the sealing lip portion 40 opposed thereto.

In assembling the vehicle or the like, when the window molding $M_2$ is attached to the vehicle body panel B in a state in which the back face of the folded-back lip portion 50 and the back face of the sealing lip portion 40 are brought into contact with each other to press each other, the back faces of the sealing lip portion 40 and the folded-back lip portion 50 are brought into contact with each other via the nonadhering layers 64. Therefore, a substantial force of adhering the folded-back lip portion 50 and the sealing lip portion 40 is small. Further, the free end portion 52 of the folded-back lip portion 50 is formed in a thin-walled shape and includes the stepped difference $d_2$ in the taper shape at the back face of the folded-back lip portion 50. In the state in which the sealing lip portion 40 and the folded-back lip portion 50 are brought into press contact with each other, the pressure acting clearance 66 is formed between the back face of the free end portion 52 of the folded-back lip portion 50 and the back face of the sealing lip portion 40 opposed thereto. Further, in running the vehicle, when the inner pressure $P_2$ (>outer pressure $P_1$) is produced at the gap 1, the inner pressure $P_2$ is initially exerted to the pressure acting clearance 66 similar to the case of the first embodiment. Since the adhering force between the sealing lip portion 40 and the folded-back lip portion 50 is reduced by the sticking prevention means $X_2$, the free end portion 52 of the folded-back lip portion 50 is easily separated from the back face of the sealing lip portion 40. The folded-back lip portion 50 is brought into close contact with the outer face of the front wall portion 22 of the vehicle body panel B by the elastic recovery force $F_2$ and the inner pressure $P_2$. In this way, sporadic occurrence of noise can effective be restrained over the entire length of the vehicular window molding $M_2$ similar to the case of the first embodiment without forming a projection or a projected streak at the back face of the sealing lip portion and/or the back face of the folded-back lip portion. Further, since the projection or the projected streak may not necessarily be formed, the embodiment is applicable particularly preferably to a widow edge molding having a possibility of bringing about "shrinkage cavity" or the like at a surface of a sealing lip portion thereof.

Further, when the sealing lip portion and the folded-back lip portion are formed by olefin species thermoplastic elastomer, as a material of the nonadhering layer which can constitute the sticking prevention means $X_2$, there is pointed out olefin species thermoplastic elastomer or the like increasing a PP (polypropylene) resin component more than that of the sealing lip portion and the folded-back lip portion and/or mixing an ultra high molecular weight ethylene resin. As a material of the nonadhering layer when the sealing lip portion and the folded-back lip portion are formed by soft vinyl chloride resin, hard through semihard vinyl chloride resin or the like having a small amount of a plasticizer is pointed out as a preferable example. The nonadhering layers can be formed simultaneously in extruding the window molding $M_2$ by coextrusion. Further, in order to reduce the adherence force, it is also conceivable to coat a mold releasing agent of, for example, silicone resin or the like. Further, the problem of the invention can be achieved when the adherence sampling means $X_2$ is formed on at least either one of the respective shield and folded-back lip portions 40 and 50. Further, in the case of extruding the nonadhering layer 64, when the projection or the projected streak is formed along therewith as in the first embodiment, the embodiment is further efficient.

Figure 6:
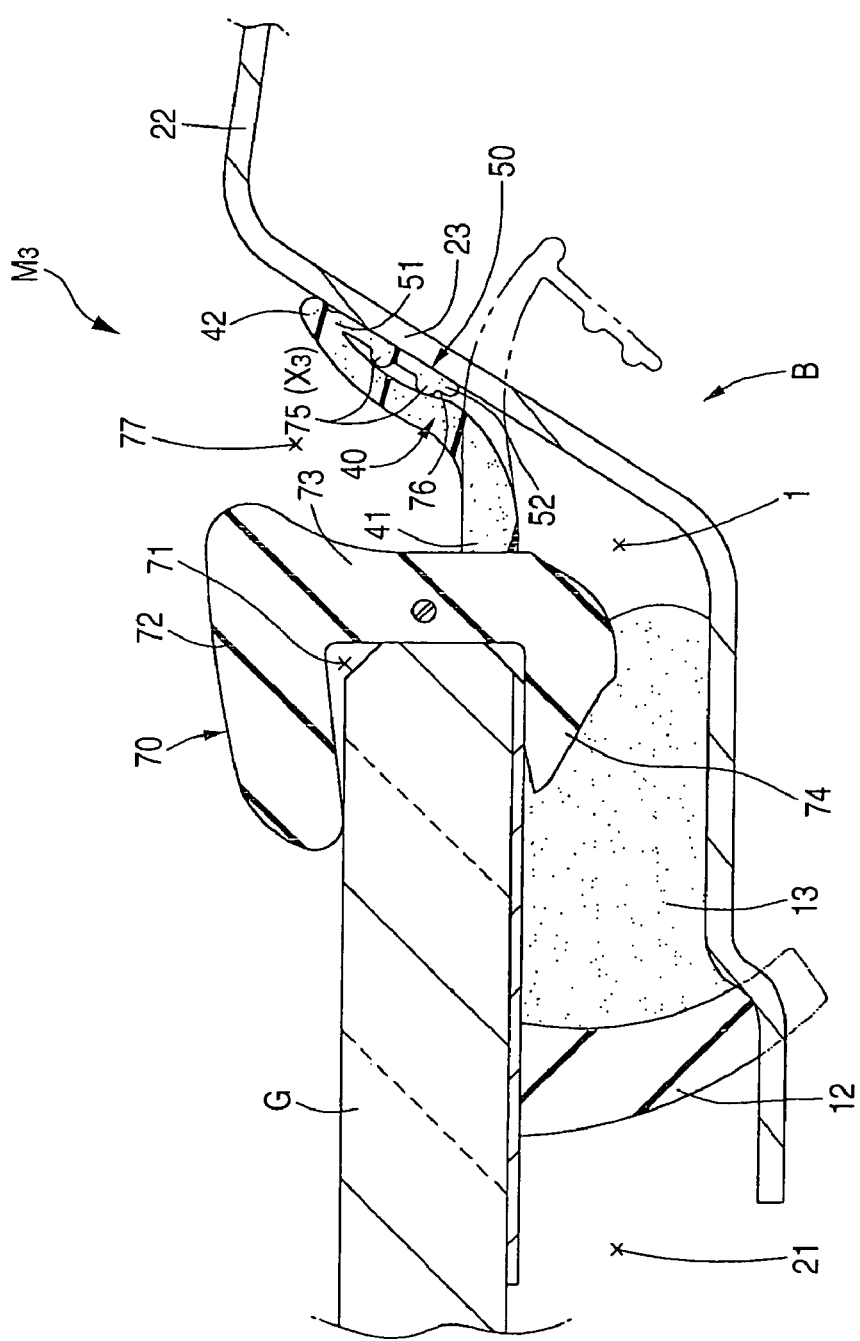
FIG. 6 is a sectional view of a window molding showing a state of covering a gap by attaching the window molding according to a third embodiment to a peripheral edge of a window pane.

FIG. 6 is a sectional view of the window molding $M_3$ in a state in which the gap 1 is covered by the window molding $M_3$ according to a third embodiment attached to the peripheral edge of the window pane G. After the window pane G is attached to the vehicle body panel B, the window molding $M_3$ is attached to push into the gap 1 formed between the peripheral edge portion of the window pane G and the vehicle body panel B to direct to the interior direction. The window molding $M_3$ is referred to as "post attaching molding". Further, the sealing lip portion 40 and the folded-back lip portion 50 remain at inside of the gap 1 to form a groove at an interval thereof from the vehicle body panel B. The window molding $M_3$ is integrally formed with the sealing lip portion 40 at a portion of a leg portion 73 constituting a molding main body portion 70 on the interior direction of an outer side face thereof. A distal end portion of the sealing lip portion 40 is integrally formed with the folded-back lip portion 50 to be directed to the inner side to be thin-walled more than the sealing lip portion 40. An ornamental portion 72 is integrally formed in the inward direction at an end portion on the exterior direction of the leg portion 73 fixed to the end face of the window pane G. An engagement portion 74 is integrally formed at an end portion on the interior direction of the leg portion 73. A fitting groove 71 is formed in the inward direction by the ornamental portion 72, the leg portion 73 and the engagement portion 74. Further, in FIG. 6, a two-dotted chain line indicates shapes of the sealing lip portion 40 and the folded-back lip portion 50 in a free state.

Further, a back side of the folded-back lip portion 50 is formed with two streaks of semicircular projected streaks 75 at a predetermined interval therebetween in the width direction of the folded-back lip portion 50. The semicircular projected streak 75 is continuously formed in the longitudinal direction of the folded-back lip portion 50. The semicircular projected streak 75 constitutes sticking prevention means $X_3$. In a state of covering the gap 1 by the sealing lip portion 40, the folded-back lip portion 50 is partially brought into contact with the sealing lip portion 40 via the semicircular projected streaks 75. The semicircular projected streak 75 formed on the free end side of the folded-back lip portion 50 is formed slightly on an inner side (on the fixed end side) of the distal end of the free end of the folded-back lip portion 50. In a state of covering the gap 1 by the sealing lip portion 40, a pressure acting clearance 76 for constantly exerting the inner pressure $P_2$ formed between the free end portion 52 of the folded-back lip portion 50 and the sealing lip portion 40.

After attaching the window pane G to the vehicle body panel B, when the window molding $M_3$ is pushed into the gap 1 formed between the peripheral edge portions G and the vehicle body panel B to direct to the interior direction, the leg portion 73 of the molding main body portion 70 is significantly deformed elastically in the outward direction. When the engagement portion 74 formed at the end portion on the interior direction of the molding main body portion 70 reaches a side of the back face of the wind plate G, the leg portion 73 is recovered to an original shape by the elastic recovery force of its own and the peripheral edge portion of the window pane G is fitted to the fitting groove 71. At this occasion, the sealing lip portion 40 is significantly deformed elastically to bring about a state in which the folded-back lip portion 50 is partially brought into contact with the back face of the sealing lip portion 40 via two streaks of the semicircular projected streaks 75. Thereby, the surface side of the folded-back lip portion 50 is brought into close contact with the inclined peripheral wall portion 23 of the vehicle body panel B over an entire face hereof. The gap 1 formed between the peripheral edge portion of the window pane G and the vehicle body panel B is covered by the sealing lip portion 40 which is significantly deformed elastically. By the sealing lip portion 40 which is significantly deformed elastically, a groove 77 for guiding rain water or the like is formed on the exterior direction of the gap 1. Rain water in running under raining weather, or a washing liquid or the like used in cleaning the window pane G and splashed in two side directions by a wiper flows down along the guide groove 77. Further, also in the window molding $M_3$, the sticking prevention means $X_3$ formed on at least one of the respective back faces of the sealing lip portion 40 and the folded-back lip portion 50 is not limited to a shape as in the semicircular projected streak 75 described above. The sticking prevention means $M_3$ can also be formed by a material as in the nonadhering layer 64 used in the window molding $M_2$. Further, the sticking prevention means $X_3$ may be formed by specifying both of the shape and the material as described above. Further, the window molding is not limited to a window molding having a constant cross-sectional face shape. The sectional shape of window molding may be changed in the longitudinal direction.

Figure 7:
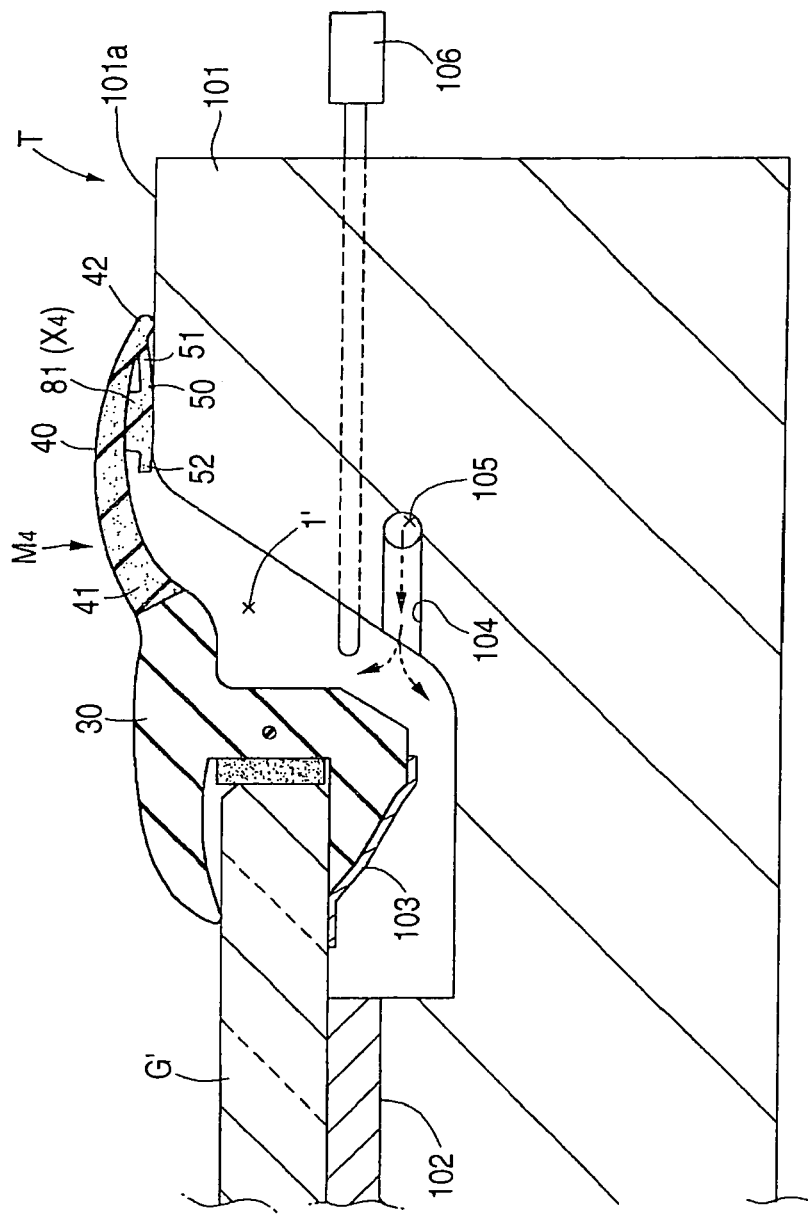
FIG. 7 is a sectional view of a window molding showing a state of mounting the window molding according to a fourth embodiment to a pressure proof test apparatus.
Figure 8:
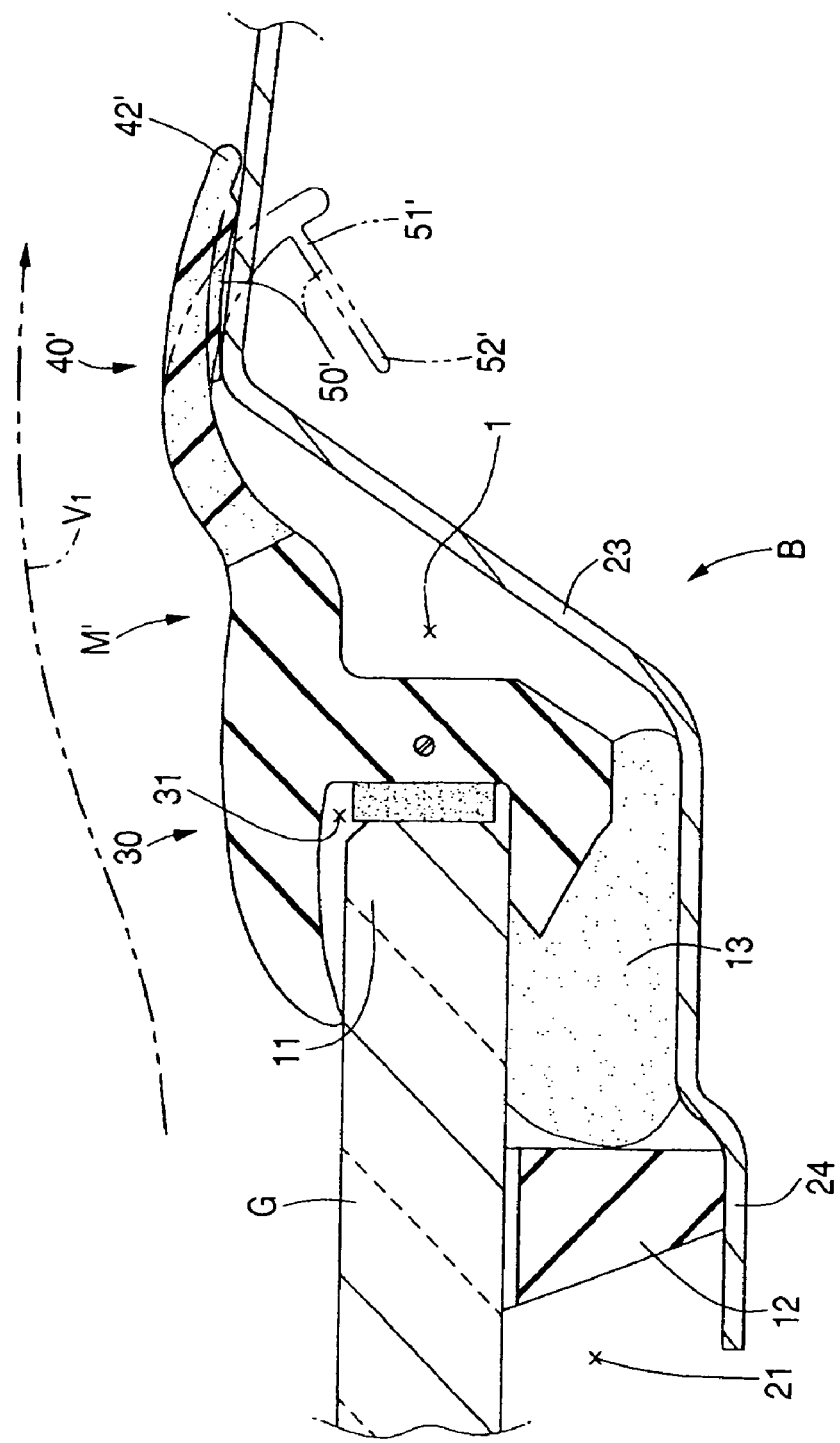
FIG. 8 is a sectional view of a conventional window molding showing a state of covering a gap by attaching the conventional window molding to a peripheral edge of a window pane.
Figure 9:
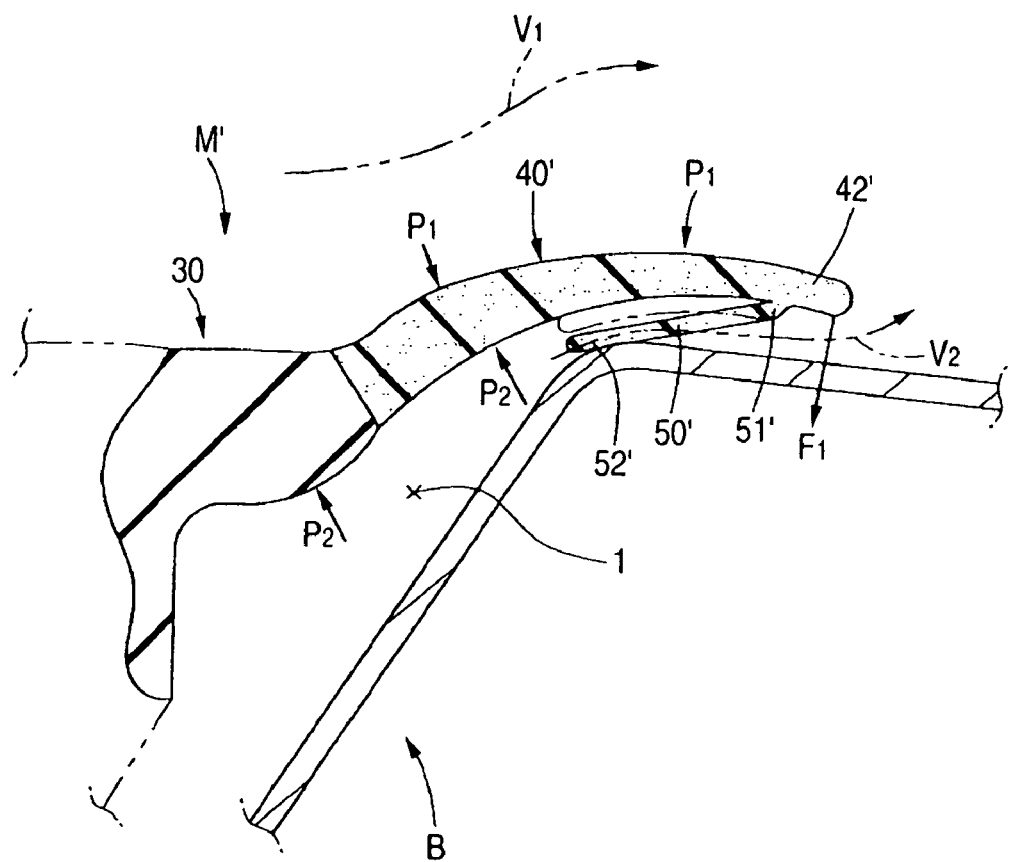
FIG. 9 is a sectional view of a conventional window molding showing a state of bringing about "air leaking phenomenon" in which a shielding lip portion and a folded-back lip portion of the conventional window molding are separated from a vehicle body panel in a state in which the field lip portion and the folded-back lip portion are brought into close contact with each other.

FIG. 7 is a sectional view of a window molding $M_4$ in a state of mounting the window molding $M_4$ according to a fourth embodiment to an air leakage pressure proof test apparatus T. According to the pressure proof test apparatus T, an upper face (surface) 101a thereof is provided with a test apparatus main body 101 formed to simulate the shape of the vehicle body panel B and the test apparatus main body 101 is provided with air flow-in holes 104 and 105 for making compressed air flow into a closed space (space in correspondence with gap 1) 1' formed by the test apparatus main body 101, a window pane G' and the window molding $M_4$ by being set in a state of attaching the window molding $M_4$ to a peripheral edge portion of a window pane G'. Further, two end portions in a longitudinal direction of the window molding $M_4$ which is set in the pressure proof test apparatus T are completely closed. Further, in FIG. 7, notation 102 designates a molding support piece and notation 103 designates a spacer. Both of the molding support piece 102 and the spacer 103 are members for mounting the window molding $M_4$ to the pressure proof test apparatus T in testing. Notation 106 designates a pressure difference meter which is an apparatus for measuring a difference between atmospheric pressure and pressure of the closed space 1'.

According to the window molding $M_4$, in comparison with the window molding $M_1$, only a constitution of sticking prevention means $X_4$ formed at the respective back faces of the sealing lip portion 40 and the folded-back lip portion 50 differs. According to the window molding $M_4$, the back face of the sealing lip portion 40 is constituted by a curved face and is not formed with sticking prevention means. Further, the back face of the folded-back lip portion 50 is formed with a projected streak 81 having a wide width. According to the window molding $M_4$, there is formed a pressure acting clearance constantly exerted with the inner pressure $P_2$ between the free end portion 52 of the folded-back lip portion 50 and the sealing lip portion 40.

A window molding of Example (1) shown below is constructed by a structure substantially the same as that of the window molding $M_4$. A width of a single piece of the projected streak 81 having the wide width formed at the back face of the folded-back lip portion 50 is about 2 mm. Further, a window molding of Example (2) is provided with two pieces of streaks having a narrow width of a width of about 0.5 mm at an interval of 1.5 mm in place of a single piece of the projected streak 81 having the wide width provided at the folded-back lip portion 50 of the window molding $M_4$. In the two pieces of window moldings of Example (1) and Example (2), a result of measuring a maximum pressure difference to be compared with a conventional example by the above-described test apparatus T is shown below. The maximum pressure difference is a pressure difference between pressure at inside of the closed space 1' and atmospheric pressure when pressure of air of the closed space 1' is gradually increased to be maximized immediately before the sealing lip portion 40 is floated up from the upper face 101a of the test apparatus main body 101 and air is blown out.

| | specification | maximum pressure difference (mmHg) |
|---|---|---|
| Conventional Example | no sticking prevention means | 60–250 |
| Example (1) | formed with 1 piece of projected streak having wide width (about 2 mm) at back face of folded-back lip portion | 359–379 |
| Example (2) | formed with 2 pieces of projected streaks having narrow width (about 0.5 mm) at interval of 1.5 mm at back face of folded-back lip portion | 362–372 |

As is apparent from the above-described test result, in both of Examples (1) and (2), a significant increase in the maximum pressure difference about 1.2 times through 6.2 times of that of the conventional example has been recognized. Therefore, it has been found that the sticking prevention means effectively functions against sporadic occurrence of noise.

According to the above described embodiments, the window moldings $M_1$ through $M_4$ according to the invention are attached to the peripheral edge portion of the window pane G of the front side to cover the gap 1 formed between the peripheral edge portion of the window pane G and the vehicle body panel B. Thereby, sporadic occurrence of noise caused by the difference between the outer pressure $P_1$ and the inner pressure $P_2$ at inside of the gap 1 can be prevented and therefore, it is effective to attach the window moldings $M_1$ through $M_4$ to the window pane G on the front side. In addition, the window molding according to the invention is not limited to be attached to the window pane on the front side but may be attached to a fixed window pane on the rear side, a fixed window pane of a door or the like. Thereby, sporadic occurrence of noise caused by the pressure difference between interior and exterior direction can be prevented at window panes other than the window pane on the front side.

As has been explained above, the window molding according to the invention is formed with the sticking prevention portion for preventing sticking between the opposed faces on at least one of the opposed faces of the sealing lip portion and the folded-back lip portion at the portion of overlapping the sealing lip portion and folded-back lip portion. Therefore, even when the free end portion of the sealing lip portion and the base end portion of the folded-back lip portion are separated to displace from the vehicle body panel to the exterior direction, the free end portion of the folded-back lip portion maintains the state of being brought into close contact with the outer face of the vehicle body panel by being exerted with the inner pressure at inside of the gap between the opposed faces and further exerted with the elastic recovery force of its own. Therefore, air at inside of gap can be prevented from leaking to outside of the sealing lip portion. Therefore, sporadic occurrence of noise caused by leaking air can effectively be prevented.

In a state in which the opposed faces of the sealing lip portion and the folded-back lip portion are brought into elastic contact with each other, the predetermined pressure acting clearance may be formed between the opposed faces of the distal end portion of the folded-back lip portion and the sealing lip portion. The inner pressure at inside of the gap acts on the pressure acting clearance constantly when the vehicle travels as the force of separating the sealing lip portion and the folded-back lip portion. As a result, the folded-back lip portion and the sealing lip portion are further firmly separated from each other. Therefore, the free end portion of the folded-back lip portion can further firmly be brought into close contact with the outer face of the vehicle body panel and sporadic occurrence of noise can further firmly be prevented.

Although the invention has been explained in details and in reference to the specific embodiments, it is apparent to the skilled person that the invention can variously be changed and modified without being deviated from the spirit and the range of the invention.

The application is based on Japanese Patent Application (Japanese Patent Application 2002-222734) filed on Jul. 31, 2002 and content thereof is included here by reference.

INDUSTRIAL APPLICABILITY

As described above, the invention is suitable for a window molding for preventing occurrence of noise caused by an air pressure difference produced between an interior and an exterior of the window molding at the clearance in running a vehicle.

The invention claimed is:

1. A vehicular window molding, comprising:
   a molding main body portion attached to an outer peripheral edge portion of a window pane arranged at inside of an opening portion provided at a vehicle body panel;
   a sealing lip portion integrally formed with the molding main body portion, the sealing lip projecting towards the vehicle body panel in a state where the molding main body portion is attached to the outer peripheral edge portion of the window pane; and
   a folded-back lip portion formed integrally with a distal end portion of the sealing lip portion, the fold-back lip portion folded back at the distal end portion to be in elastic contact with an outer face of the vehicle body panel;
   wherein opposed faces are provided on the sealing lip portion and the folded-back lip portion respectively, the opposed faces opposed to each other; and
   at least one of the opposed face of the sealing lip portion and the opposed face of the folded-back lip portion is provided with a sticking prevention portion for preventing the one from being adhered to the other.

2. The vehicular window molding according to claim 1, wherein the sticking prevention portion includes a projection provided on at least one of the opposed face of the sealing lip portion and the opposed face of the folded-back lip portion and projected to the other of the opposed face of the sealing lip portion and the opposed face of the folded-back lip portion.

3. The vehicular window molding according to claim 2, wherein the vehicular window molding extends longitudinally; and the projection extends in the longitudinal direction of the molding.

4. The vehicular window molding according to claim 1,
   wherein the sticking prevention portion includes a sticking prevention layer;
   the sticking prevention layer is provided at one of the opposed face of the sealing lip portion and the opposed face of the folded-back lip portion; and
   the sticking prevention layer is formed by a material which is not adhesive to the other of the opposed face of the sealing lip portion and the opposed face of the folded-back lip portion.

5. The vehicular window molding according to claim 2,
   wherein the sticking prevention portion includes a sticking prevention layer;
   the sticking prevention layer is provided at one of the opposed face of the sealing lip portion and the opposed face of the folded-back lip portion; and
   the sticking prevention layer is formed by a material which is not adhesive to the other of the opposed face of the sealing lip portion and the opposed face of the folded-back lip portion.

6. The vehicular window molding according to claim 3,
   wherein the sticking prevention portion includes a sticking prevention layer;
   the sticking prevention layer is provided at one of the opposed face of the sealing lip portion and the opposed face of the folded-back lip portion; and
   the sticking prevention layer is formed by a material which is not adhesive to the other of the opposed face of the sealing lip portion and the opposed face of the folded-back lip portion.

7. The vehicular window molding according to claim 1,
   wherein the sticking prevention portion includes a sticking prevention layer;
   the sticking prevention layers are provided at both of the opposed face of the sealing lip portion and the opposed face of the folded-back lip portion; and
   the sticking prevention layers are formed by materials not adhesive to each other.

8. The vehicular window molding according to claim 2,
   wherein the sticking prevention portion includes a sticking prevention layer;
   the sticking prevention layers are provided at both of the opposed face of the sealing lip portion and the opposed face of the folded-back lip portion; and
   the sticking prevention layers are formed by materials not adhesive to each other.

9. The vehicular window molding according to claim 3,
   wherein the sticking prevention portion includes a sticking prevention layer;
   the sticking prevention layers are provided at both of the opposed face of the sealing lip portion and the opposed face of the folded-back lip portion; and
   the sticking prevention layers are formed by materials not adhesive to each other.

10. The vehicular window molding according to claim 1,
    wherein the folded-back lip portion includes a distal end portion; and
    a predetermined pressure acting clearance is formed between the distal end portion of the folded-back lip portion and the opposed face of the sealing lip portion in a state where the opposed face of the sealing lip portion and the opposed face of the folded-back lip portion are brought into elastic contact with each other.

11. The vehicular window molding according to claim 2,
    wherein the folded-back lip portion includes a distal end portion; and
    a predetermined pressure acting clearance is formed between the distal end portion of the folded-back lip portion and the opposed face of the sealing lip portion in a state where the opposed face of the sealing lip portion and the opposed face of the folded-back lip portion are brought into elastic contact with each other.

12. The vehicular window molding according to claim 3,
    wherein the folded-back lip portion includes a distal end portion; and
    a predetermined pressure acting clearance is formed between the distal end portion of the folded-back lip portion and the opposed face of the sealing lip portion in a state where the opposed face of the sealing lip portion and the opposed face of the folded-back lip portion are brought into elastic contact with each other.

13. The vehicular window molding according to claim 4,
    wherein the folded-back lip portion includes a distal end portion; and
    a predetermined pressure acting clearance is formed between the distal end portion of the folded-back lip portion and the opposed face of the sealing lip portion in a state where the opposed face of the sealing lip portion and the opposed face of the folded-back lip portion are brought into elastic contact with each other.

14. The vehicular window molding according to claim 5,
    wherein the folded-back lip portion includes a distal end portion; and
    a predetermined pressure acting clearance is formed between the distal end portion of the folded-back lip portion and the opposed face of the sealing lip portion in a state where the opposed face of the sealing lip portion and the opposed face of the folded-back lip portion are brought into elastic contact with each other.

15. The vehicular window molding according to claim 6, wherein the folded-back lip portion includes a distal end portion; and a predetermined pressure acting clearance is formed between the distal end portion of the folded-back lip portion and the opposed face of the sealing lip portion in a state where the opposed face of the sealing lip portion and the opposed face of the folded-back lip portion are brought into elastic contact with each other.

16. The vehicular window molding according to claim 7, wherein the folded-back lip portion includes a distal end portion; and a predetermined pressure acting clearance is formed between the distal end portion of the folded-back lip portion and the opposed face of the sealing lip portion in a state where the opposed face of the sealing lip portion and the opposed face of the folded-back lip portion are brought into elastic contact with each other.

17. The vehicular window molding according to claim 8, wherein the folded-back lip portion includes a distal end portion; and a predetermined pressure acting clearance is formed between the distal end portion of the folded-back lip portion and the opposed face of the sealing lip portion in a state where the opposed face of the sealing lip portion and the opposed face of the folded-back lip portion are brought into elastic contact with each other.

18. The vehicular window molding according to claim 9, wherein the folded-back lip portion includes a distal end portion; and a predetermined pressure acting clearance is formed between the distal end portion of the folded-back lip portion and the opposed face of the sealing lip portion in a state where the opposed face of the sealing lip portion and the opposed face of the folded-back lip portion are brought into elastic contact with each other.

* * * * *